May 7, 1963   M. COTTON DE BENNETOT   3,089,064
COMBINED PERMANENT MAGNET AND ELECTROMAGNET
Filed Feb. 3, 1959   5 Sheets-Sheet 3

United States Patent Office 3,089,064
Patented May 7, 1963

3,089,064
COMBINED PERMANENT MAGNET
AND ELECTROMAGNET
Michel Cotton de Bennetot, Vaucresson, France, assignor to Société d'Electro-Chimie, d'Electro-Metallurgie et des Acieries Electriques d'Ugine, a corporation of France
Filed Feb. 3, 1959, Ser. No. 790,941
Claims priority, application France Feb. 8, 1958
6 Claims. (Cl. 317—123)

The present invention relates to a novel and improved type of magnetic device adapted both to induce a magnetic field in a portion of the space and to cause it to be suppressed, as desired. Such a device is intended to replace conventional permanent magnet and electromagnet systems in a large number of practical applications.

The magnetic device according to the invention comprises at least one pair of permanent magnets, armature members placed in such a manner as to constitute with at least one of said pairs of magnets a closed magnetic circuit, said armature members defining, on the other hand, at least one air gap outside said magnetic circuit, and means adapted to reverse the direction of magnetization of one of the magnets of at least one of said pairs of magnets in order to prevent the flux path to close along the magnetic circuit formed by said pair and the armature members and cause it to close through at least one of said air gaps.

The magnetization of the magnets in one or in the other direction, in view of energizing or de-energizing said device, is effected by causing a current to flow, in a suitable direction, through coils wound on said magnets. This current is applied during a very short period of time, for energizing the device and during another very short period for de-energizing it. For de-energizing the device, the current is applied in certain coils in the same direction as for energizing it, and in the opposite direction in the other coils.

An important advantage of the magnetic device according to the invention lies in that it requires substantially no power supply for its operation except during the short intervals of time when it is energized or de-energized.

The device combines, in a way, the advantages of a permanent magnet system—no consumption of electric current, and therefore no dependency on breakdowns of energy supply during its operation—with those of an electromagnet—easy control, and, more particularly, easy remote control.

The invention will be best understood from the ensuing description and appended drawings, giving, by way of non-limitative examples, a few embodiments of the device; in the drawings:

FIGS. 1a and 1b diagrammatically show a device according to the invention in inactive and working conditions, respectively;

FIG. 2 is a schematic view of an eddy current magnetic brake which comprises a device according to the invention;

FIGS. 3 and 4 diagrammatically show the magnetizing circuit, and illustrate, respectively, the method of energizing and de-energizing the magnetic brake of FIG. 2;

FIG. 5 diagrammatically illustrates, partly in elevation, partly in cross-section, one embodiment of said magnetic brake;

FIGS. 11 and 12 are diagrams of an alternative embodiment of an eddy current magnetic brake, of which

Figure 14:
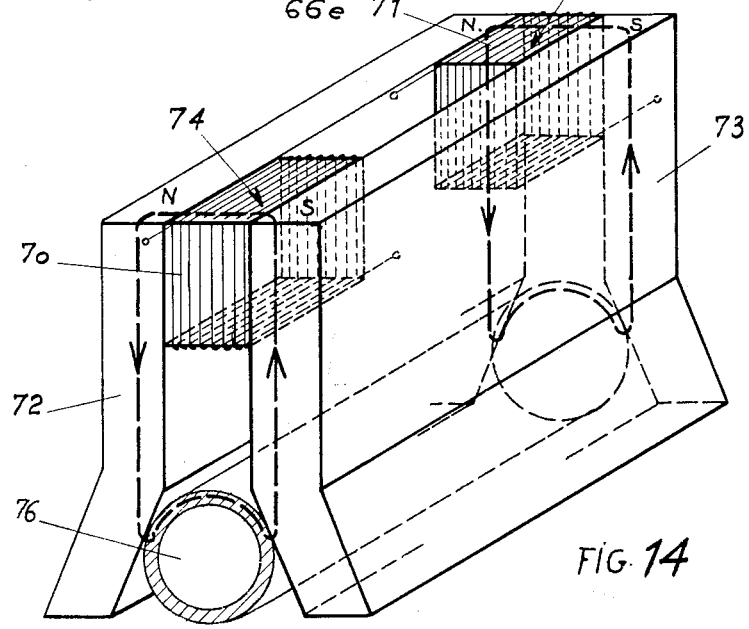

FIG. 14 diagrammatically shows a lifting device comprising a magnetic device according to the invention.

Figure 1A:
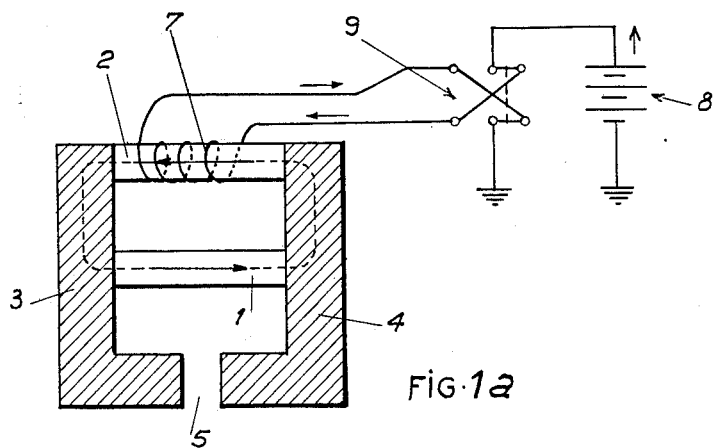
Figure 1B:
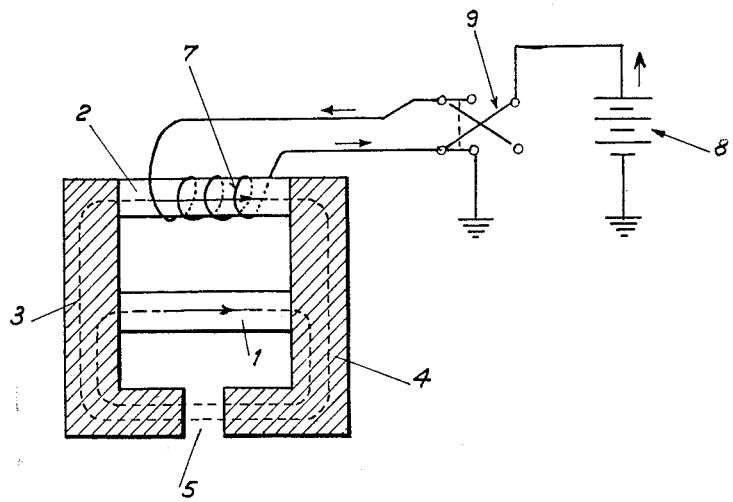

Referring first to FIGS. 1a and 1b, a magnetic circuit is illustrated, consisting of two permanent magnets 1 and 2 and two armature members 3 and 4 of a soft magnetic material, said armatures forming an air gap 5.

Permanent magnet 1 has a magnetic polarization directed along the arrow as shown. The direction of magnetic polarization of magnet 2 may be reversed by means of a coil 7 wound on said magnet and through which a current may be caused to flow in one or in the other direction by means of battery 8 and two-pole switch 9.

In FIG. 1a, the magnetic flux path is closed as shown by the dotted line: it is apparent that the magnets 1 and 2 form with part of the armature members 3 and 4 a closed magnetic circuit: such a circuit is known to produce no external magnetic field: the useful flux of the circuit, i.e. the flux through the air-gap 5, is then nil.

In view of this, magnets 1 and 2 must obviously form with the sections of armature members 3 and 4 which join the ends thereof an actually closed magnetic circuit wherein the flux is flowing without any appreciable leakage. This implies that the product of the remanent induction $B_R$ by the area of the cross-section S of the magnet is practically the same for both magnets 1 and 2; in the present specification, it is assumed that this condition is satisfied, both magnets having for instance substantially identical sections and being made of the same material.

In FIG. 1b, the direction of magnetic polarization in magnet 2 having been reversed, there is then no closed magnetic circuit including magnets 1 and 2, and since the respective flux paths through the magnets close as shown by the dotted lines, a useful flux will now be produced in air gap 5.

It should be noted that, in order for said "useful" flux to be high, on one hand the product $H_d.L$ must be high ($H_d$ being the demagnetizing field of the material constituting magnets 1 and 2, and L their length). This may be derived from the relation: $H_d.L=h.l$, where $h$ is the field in the region of the air gap and the load, i.e. the "useful" induction which it is desired to obtain and $l$ the length of the air section equivalent to the parasitic air gaps and to the load attracted by the device, which is a given data depending on dimensions of the load.

In order that the two above conditions be satisfied, i.e. that both products $H_d.L$ and $B.S$ be high, it can be shown that the value assigned to $H_d$ must be comparatively large. Therefore, pieces 1 and 2 should be made of a material having a high coercivity, substantially higher, in any case, than that of the so-called "soft" magnetic materials.

While the above discussion lays no claim to being strictly rigorous, it is to be understood that the validity of the invention is in no way impaired thereby. These explanations only tend to a better understanding of what is meant by "permanent magnet" in the present specification. A "soft" material, even presenting a remanent induction which might appear sufficient to provide the useful flux which it is desired to obtain, could not in practice constitute the "permanent magnets" used in the device of the present invention (since its coercive force will not be sufficient, as mentioned above).

However, the coercive force of the material forming these magnets may be the lower, as the desired effective induction is lower, the parasite air gaps are smaller and the magnetic material forming the charge is the more permeable. In certain limiting cases, the term "permanent magnet" may therefore designate a piece made of permanent magnetic material, comparatively close to a soft magnetic material, but the coercive force of which is substantially higher than that of the material constituting the armature members 3 and 4.

It may finally be observed that the material forming the "permanent magnets" 1 and 2 will preferably be an oriented magnetic material, as will be more fully explained hereinafter.

The shape and the arrangement of the various parts of the magnetic circuit are illustrated diagrammatically in FIGS. 1 and 1b, while a few embodiments of the device will be described which are preferred in relation with the particular applications considered. Other forms and arrangements are, however, also possible, within the scope of the invention, as defined by the appended claims.

In said definition, at least two permanent magnets are considered; it should however be noted that the two permanent magnets may also be placed side by side so as to build a single piece, provided however that the two halves of this single piece may be magnetized, respectively along two opposite directions of polarization.

The various advantages of the magnetic device according to the invention have been briefly mentioned hereinabove and will appear more clearly from the following non-limitative examples.

The first of these examples relates to an eddy current brake.

Figure 2:
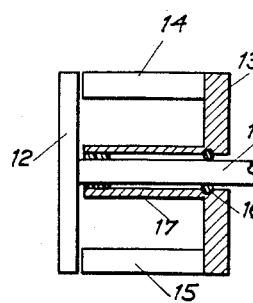

The diagram shown in FIG. 2 illustrates an eddy current magnetic brake, wherein reference numeral 11 designates a rotating shaft the movement of which is to be braked up, 12 a rotor rigidly locked to said shaft (shown, by way of example, in the shape of a disc), 13 a stationary yoke supporting a magnetic device indicated diagrammatically as formed by pieces 14 and 15 and which is adapted to generate eddy currents in rotor 12. Yoke 13 may also form part of the magnetic circuit of the device. It will absorb the magnetic attraction effort on disc 12 and support the rotating shaft, for instance on a ball bearing 16 and sleeve 17.

Figures 3, 4:
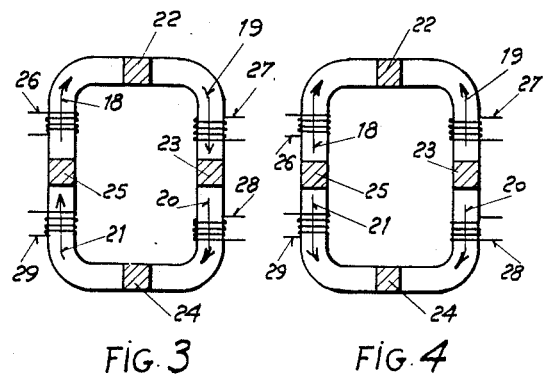

It is to be understood that this general arrangement of the braking device is not limitative, the novel feature of the invention lying in the magnetic device 14—15, the operation of which is illustrated in FIGS. 3 and 4.

The device illustrated in FIGS. 3 and 4 comprises four permanent magnets 18, 19, 20, 21. Pieces 22, 23, 24, 25 of a soft magnetic material, are interposed between the magnets. The permanent magnets 18 through 21 constitute a closed circuit having a center of symmetry, any two points of said circuit which are symmetrical with respect to said center of symmetry, having the same intensity of magnetization or a directly opposite intensity. This result may be obtained by making use, for the manufacture of the magnets, of an oriented magnetic alloy. These alloys present a preferred direction along which the magnetic properties are particularly high; the vector intensity of magnetization may then assume directly opposed values parallel to said direction.

In the case of FIG. 3, a current is caused to flow through coils 26, 27, 28, 29 in such directions that the circuit becomes magnetized, along a preferred direction of the magnetic material, in the direction indicated by the arrows.

Under these conditions, the circulation of the magnetic field vector along the closed circuit thus formed being nil, and the fields at two symmetrically located points of the circuit being equal, it may be readily shown that the magnetic field is necessarily nil at any point inside the circuit except for a low residual field due to the heterogeneity of the magnets. Moreover, the external field is also substantially nil and no appreciable residual braking effort is exerted by the magnetic brake.

In the case of FIG. 4, by causing a pulse of current to flow, in the same direction as in the case of FIG. 3, through coils 26 and 28, and in the opposite direction through coils 27 and 29, a field distribution will be obtained—as shown by the arrows—such that each point of the circuit corresponds to a symmetrically located point having a directly opposed field. Under these conditions, it may be shown that the circuit generates a magnetic field: by properly dimensioning the magnetic circuit and selecting the magnetizing current intensity, this field may cause eddy currents of an intensity appropriate to the desired braking action to flow through rotor 12 (FIG. 2).

An essential advantage of the system described lies in the fact that there is no power consumption except during the very short time interval when the current must flow through the coils in order to energize the magnets, i.e. at the instant of energizing and at the instant of de-energizing the braking device. The total power consumption is finally much smaller than in the case of an electro-magnet working in the same conditions.

The reliable and efficient operation of the magnets results from the fact that they always operate, after being magnetically saturated, at a stable point of their hysteresis loop: the geometrical dimensions of the circuit and of the air gap may be constant by construction, while the magnets, after being magnetized at the saturation point, maintain a stable magnetization during the entire braking operation, they also maintain a stable magnetization, along the same direction as the former for some of the magnets and in the opposite direction for the others, during the entire period of time when the brake is not operating.

In a practical development of the braking device described above, the pulses of magnetizing current may be readily provided, for instance, by the battery of the vehicle on which the device is installed.

Certain quite specific novel applications of the device may be considered: for instance, for braking up carriages moved by gravity and driven down a slope, the electrical power supply for energizing and de-energizing the braking device may be provided by external sources located at the top or at the bottom of the slope, no energy supply source being provided on board the vehicle.

It is to be understood that the circuit in FIGS. 3 and 4, which forms the essential part of the magnetic device of the invention, could be associated to devices other than the brake in FIG. 2, which has been given by way of example solely.

On the other hand, it will be noted that the principle of the device illustrated in FIGS. 3 and 4—and which is a particular embodiment of the more general type shown in FIG. 1—implies only that the arrangement of the permanent magnets be symmetrically repetitive; the number and shape of the magnets and of the pieces of soft magnetic material which consttiute the external circuit are by no way limitative.

In the embodiment of FIG. 2, it has been assumed that the portion of the magnetic circuit not including the magnets, and indicated schematically by pole pieces of soft magnetic material 22, 23, 24, 25 (FIGS. 3 and 4) is in the shape of bars such as 14 and 15, adapted to constitute a closed magnetic circuit incorporating rotor 22. It should however be noted that, provided the latter condition is satisfied, the shape of the pole pieces is not limitative.

Figure 5:
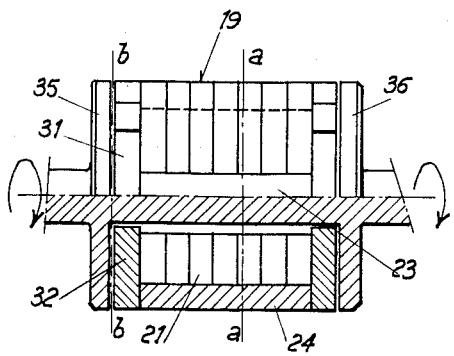
Figure 6:
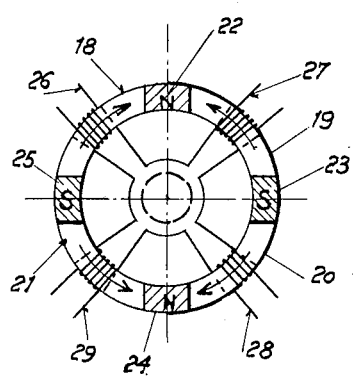
FIGS. 6 and 7 are cross-sectional views of the magnetic brake of FIG. 5, taken along axes a—a and b—b, respectively.
Figure 7:
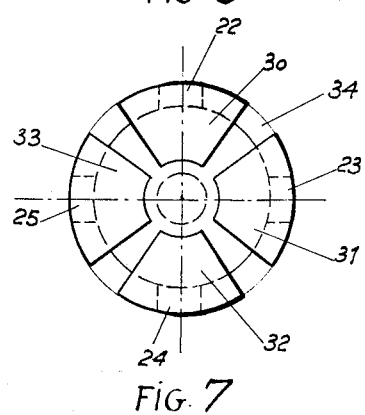
Figure 9:
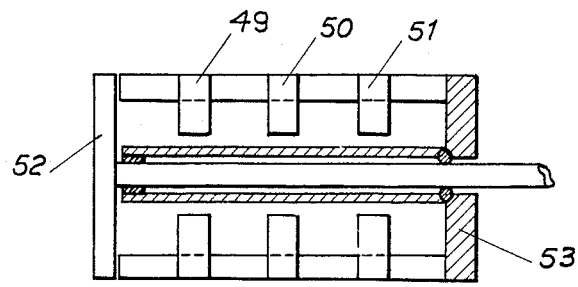
FIG. 9 illustrates diagrammatically a magnetic brake having an adjustable braking torque, of which the diagrams shown in FIGS. 10a, 10b and 10c represent the respective magnetizing coils.

A practical non limitative embodiment of the device is represented diagrammatically in FIGS. 5, 6 and 7.

In these figures, permanent magnets 18 through 21 form with bars 22, 23, 24 and 25, made of a soft magnetic material, a hollow cylinder which is shown in the lower half of FIG. 5 in cross-section parallel to its axis. A yoke of soft magnetic material, engaging each end of this cylinder, comprises, in the example described, four circular sector elements such as 30 to 33, FIG. 7.

Each one of these sectors is spaced apart from the other two adjacent selectors by an air gap such as 24, of sufficient width for the flux derived from one of the north sectors to be prevented to pass directly to the adjacent south sector and thus short-circuit the disc. Moreover, each sector is in contact with one of the bars, of which it forms, in a way, the pole shoe. In operation (the fields being distributed as shown in FIG. 4), the magnetic flux concentrated by the bars 22 through 25 develops across the respective corresponding sectors 30 to 33 and the magnetic circuit closes on passing from one sector to the adjacent ones (the latter corresponding to south poles if the sector considered corresponds to a north pole), through the facings portion of the rotary disc (35 or 36). An air gap of proper thickness separates the yoke (30 to 33) from the corresponding disc 35. The discs are rigidly locked to the rotating shaft by suitable means not shown.

Figure 8:
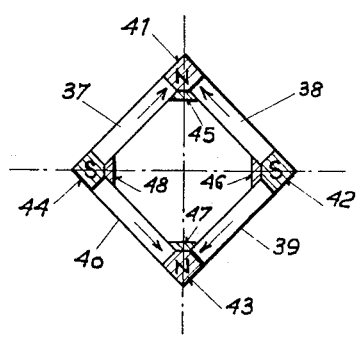
FIG. 8 is a diagram of an alternative embodiment of the magnetizing circuit.

FIG. 8 shows in cross-section the magnetic circuit of an alternative embodiment of the device. For the sake of simplicity of construction, the permanent magnets (37, 38, 39, 40) have been given a flat shape. Reference numerals 41 through 44 designate bars of soft magnetic material; reference numerals 45, 46, 47 and 48 designate shims.

It is essential to note that, in the magnetic control device just described, there occurs no undesirable fluctuation of the braking torque due to an increase of the temperature of the coils of the magnetizing circuit.

On the other hand, said torque may be readily adjusted by reducing the strength of the magnetizing current or by modifying the direction of polarization of the magnets of part of the circuit.

According to the invention it is preferred however to divide the circuit into several circuit closed sections, energized independently from one another, so that each one produces in the air-gap of the device an induction adapted to the desired control operation.

FIGS. 9 and 10a–10b–10c illustrate, by way of example, an embodiment of a braking device of this type.

Figure 10A:
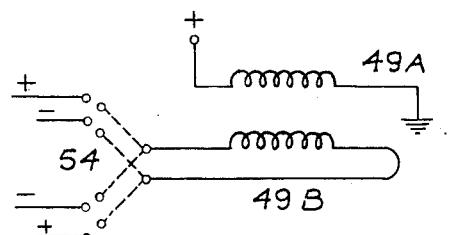
Figure 10B:
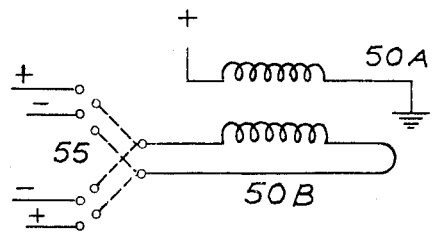
Figure 10C:
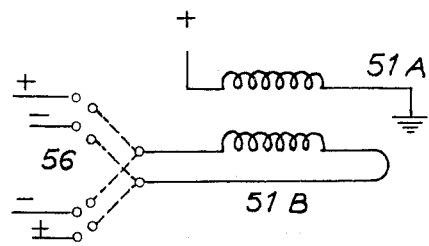

In these figures, 52 designates the disc, 53 the magnetizing circuit, the latter consisting of three closed circuit sections 49, 50, 51 which are respectively energized by three sets of coils 49A—49B (FIG. 10a), 50A—50B (FIG. 10b) and 51A—51B (FIG. 10c).

Such a braking device might have: a low-torque operating position, in which circuit 49 is energized so as to produce a field in the air gap, circuits 50 and 51 producing no fields; a medium-torque operating position, in which circuits 49 and 50 produce a field; a strong torque operating position, in which the three circuits produce a field; and a zero position, in which none of the circuits produces any field.

Preferably, the energization of the device will be effected by acting simultaneously on the energization of all the circuits which must generate a field. However, upon acting gradually on the energization of the circuits, it will be necessary, when energizing the device, to act successively on circuits 49 through 51 and, when de-energizing the device, on the magnetization of core 51, then 50, then 49, in the order mentioned.

In the non limitative embodiment of FIGS. 10a–10b–10c, the top half-circuits 49A, 50A, 51A remain permanently magnetized in the same direction, while the bottom half-circuits 49B, 50B and 51B will be separately magnetized with one or the other direction of polarization, through the use of commutators 54, 55 and 56, for their energization or de-energization.

Figure 11:
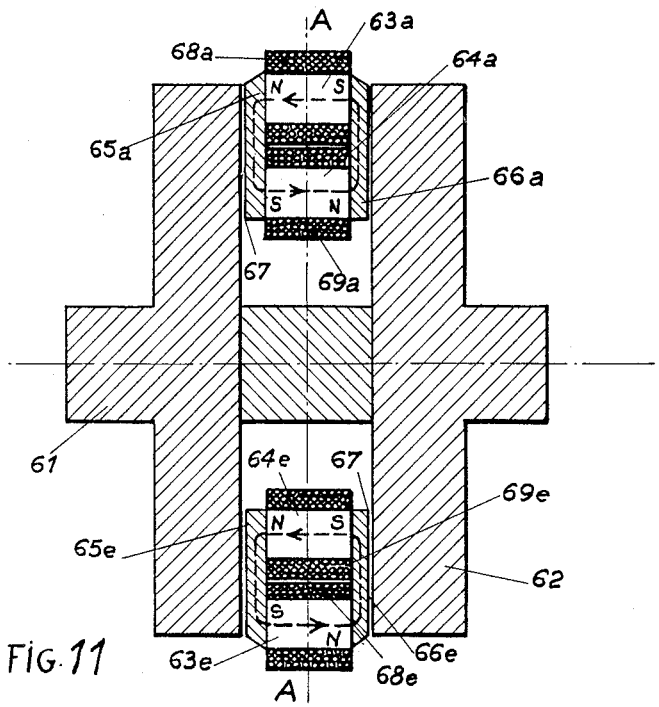
Figure 12:
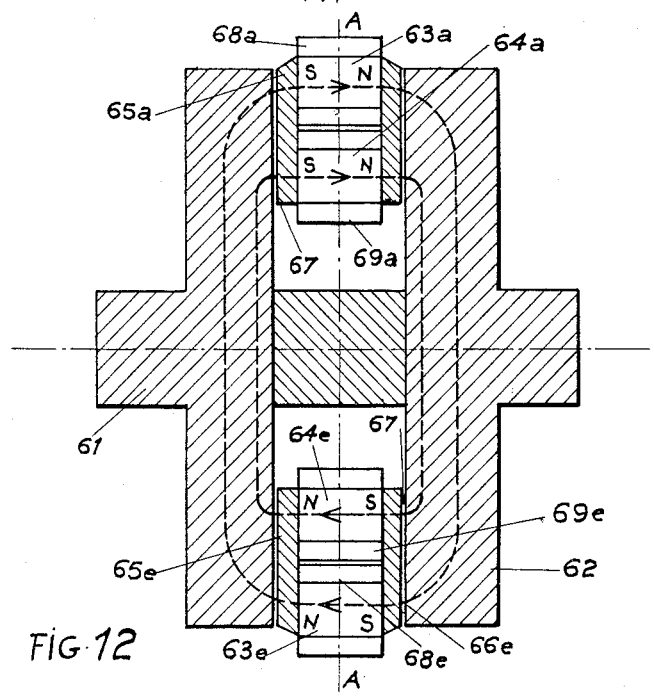
Figure 13:
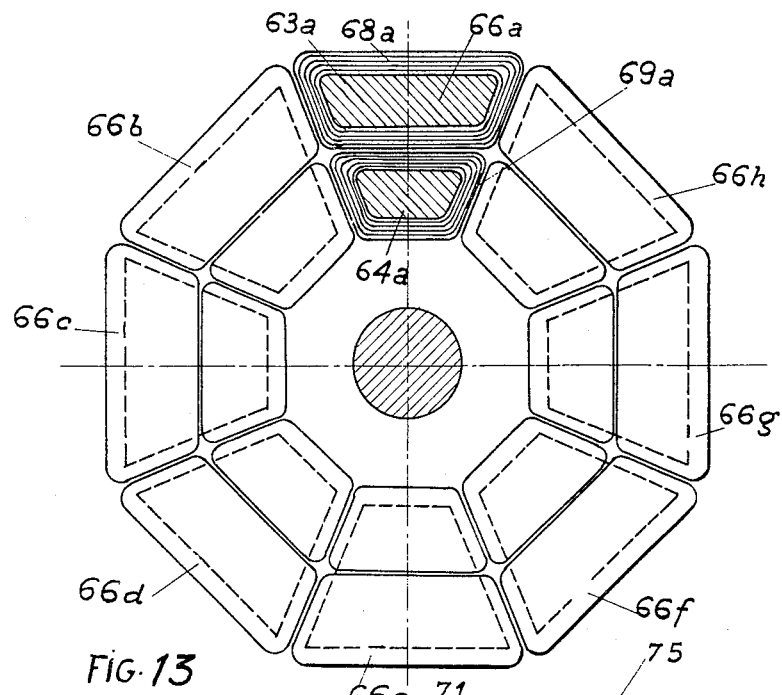
FIG. 13 is a fragmentary, cross-sectional view along A—A in FIG. 11.

In FIGS. 11 to 13, the same reference numerals designate similar elements: 61 is a rotating shaft, 62 one or a plurality of discs rigidly locked to said shaft, 63a and 64a a first pair of permanent magnets secured to two pole pieces 65a and 66a of a soft magnetic material, 63e and 64e a second pair of magnets secured to two pole pieces 65e and 66e.

As is apparent from FIG. 13, the practical embodiment described comprises eight pole pieces facing each disc, and a pair of permanent rectilinear magnets parallel to the axis of rotation are secured to each of said pole pieces.

There has been diagrammatically shown the windings which are adapted to energize these bars parallel to their greater dimension by causing to flow therethrough currents of proper direction during a very short interval of time, for the energization or de-energization of the device. Letters S and N designate, respectively, the south and north poles of the magnets when the device is not operating (FIG. 11) and when it is operating (FIG. 12).

In FIG. 11, each pair of bars (for instance 63a, 64a) constitute, with the associated pole pieces (65a, 66a), a closed magnetic circuit producing no field in air gap 67.

Upon reversing the magnetic polarization of magnet 63a and of magnet 63e (by causing a properly directed current to flow, during a very short time, through their coils), the flux of each of the two coils of the pair (63a, 64e) will close through one of the magnets of the pair (63d, 64e), through air gaps 67.

In the example of FIGS. 11–13, the direction of magnetic polarization of a second pair of two magnets pertaining to two distinct pairs, and, sequentially, of a third and a fourth pair, may be reversed: there is thus obtained a control in five steps of the value of the magnetic flux produced in air gaps 67 (the first step, which corresponds to the zero value, being shown in FIG. 11).

It may be shown, on the other hand, that such an arrangement will provide a gradual energization or de-energization, while providing an operation of the magnets with an optimum efficiency. The value of the supply voltage being predetermined, it is obvious that since it can be applied successively to the various sets, instead of being applied to the whole structure, the coils finally may be made of a wire having a highly reduced diameter, which permits reducing the size of the device.

In FIG. 13, the eight pole pieces (shown in dotted lines) 66a to 66h are located at the respective ends of the device.

In this figure, the two bars 63a and 64a and the coils wound on them (68 and 69, respectively), have been illustrated in cross-section.

The skilled man will readily be able to determine the ratio of the cross-sections of the magnets and associated pole pieces in such a manner that the magnetization conditions be such that, in the rest position of the device, each magnetic circuit generates no appreciable induction in its air gap.

The principle, as described above, of the control of several magnetic circuits according to the invention by a single battery is one of the features of the invention and can be applied, not only to a magnetic clutch or brake, but to any equipment—for instance a lifting device—comprising a magnetic device according to the invention.

This also applies to other essential features of the magnetic circuits just described, the magnetic brake being but one of the many possible applications of the invention, among which the applications to the lifting devices are particularly important.

The lifting device illustrated in FIG. 14 comprises essentially two permanent magnets in the shape of bars 70 and 71, joined by means of two pole pieces of a soft magnetic material.

The figure also shows the energizing coils 74 and 75 of the bars 70 and 71.

The operating principle of the apparatus is the same as that of the braking device described hereinabove: in the device illustrated, it is assumed that a current is caused to flow, during a fraction of a second, through coils 74 and 75, such that bars 70 and 71 are magnetized with the indicated directions of polarization: the magnetic flux will then close through the piece to be lifted (tube 76), and the device is then in operation; upon causing a pulse of current to flow in the same direction as above in one of the coils 74—75, in the opposite direction in the other, the flux will close through those portions of the pieces 72 and 73 which are located at the level of bars 70 and 71, thus de-energizing the device.

It will be noted that the operating security of such a lifting device is particularly remarkable, since the lifted object remains in an attracted position as long as no current, properly directed for reversing the direction of polarization of certain magnets as shown above, is sent through the corresponding coils.

Another advantage of the invention lies in the fact that the described lifting device may be used with an increased loading factor without fearing excessive heating of the coils or exhaustion of the source of power supply.

It is to be understood that the above embodiments are by no way limitative: for instance, without departing from the scope of the invention, a plurality of structures such as that illustrated in FIG. 14 might be grouped in a single lifting device.

The magnetic device according to the invention may be used, owing to its very low energy consumption, in a certain number of applications of the magnetic control which have been considered as practically impossible until now with conventional electromagnets or other known magnetic devices: for instance, it has been possible to develop a completely autonomous mobile lifting truck carrying, supported on a carriage or other light vehicle, a magnetic device for loading and lifting magnetic objects (or objects contained in packings provided with certain magnetic parts).

This magnetic device, developed according to the principle disclosed by the present invention—and contrary to an electromagnet—has a sufficiently low energy consumption so as to enable it to be fed by a battery of accumulators, the load of which is maintained by the electric dynamo of the vehicle engine.

What is claimed is:

1. A magnetic device comprising at least one pair of permanent magnets, armature members forming with at least said one pair a closed magnetic circuit and defining, on the other hand, at least one air gap outside said circuit, said magnetic device comprising means adapted to reverse the direction of magnetic polarization of one of the magnets of at least said one pair, whereby the flux is prevented to close along the magnetic circuit formed by said pair and said armature members and caused to close through at least said one air gap.

2. A magnetic device comprising armature members and at least two pairs of permanent magnets said two pairs of magnets forming with said armature members a closed circuit having a center of symmetry, the intensities of magnetization at any two points of said circuit which are symmetrical with respect to said center of symmetry having the same magnitude, said armature members further forming at least one air gap outside said circuit, said magnetic device comprising means adapted to reverse the direction of magnetic polarization of one of the magnets of at least one of said two pairs, whereby the flux is prevented to close along the magnetic circuit formed by said pair and said armature members and caused to close through at least said one air gap.

3. A magnetic device comprising at least one pair of permanent magnets, armature members forming with at least said one pair a closed magnetic circuit and defining, on the other hand, at least one air gap outside said circuit, said magnetic device comprising energizing coils associated with at least one of the magnets of at least said one pair; a source of energizing current and switching means connecting said energizing coils to said source.

4. A magnetic device comprising a plurality of pairs of permanent magnets, armature members forming with the respective pairs a plurality of closed magnetic circuits and defining, on the other hand, a plurality of air gaps; a common electrical supply source; a plurality of energizing coils each wound on at least one of the magnets of each of said pairs and switching means connecting said energizing coils to said source.

5. An eddy current control device of the type wherein a piece rigidly locked to the piece the movement of which is to be controlled is linked with a magnetic flux which can be suppressed and re-established, comprising at least one pair of permanent magnets, armature members forming with at least said one pair a closed magnetic circuit and defining, on the other hand, at least one air gap outside said circuit, said magnetic device comprising means adapted to reverse the direction of magnetic polarization of one of the magnets of at least said one pair.

6. A lifting apparatus comprising at least one magnetic device including at least one pair of permanent magnets, armature members forming with at least said one pair a closed magnetic circuit and defining, on the other hand, at least one air gap outside said circuit, said magnetic device comprising means adapted to reverse the direction of magnetic polarization of one of the magnets of at least said one pair, whereby the flux is prevented to close along the magnetic circuit formed by said pair and said armature members and caused to close through at least said one air gap.

References Cited in the file of this patent

UNITED STATES PATENTS

| | | |
|---|---|---|
| 751,442 | Andrews | Feb. 9, 1904 |
| 1,534,753 | Watson | Apr. 21, 1925 |
| 2,491,098 | Field | Dec. 13, 1949 |
| 2,888,290 | Pierce | May 26, 1959 |